United States Patent
Jun et al.

(10) Patent No.: US 8,175,149 B2
(45) Date of Patent: May 8, 2012

(54) METHOD AND APPARATUS FOR CONTROLLING BITRATE OF SCALABLE VIDEO STREAM

(75) Inventors: Dong-San Jun, Daejeon (KR); Jae Gon Kim, Daejeon (KR); Jin Woo Hong, Daejeon (KR); Jong-Ki Han, Seoul (KR); Nae-ri Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 848 days.

(21) Appl. No.: 12/093,788

(22) PCT Filed: Nov. 21, 2006

(86) PCT No.: PCT/KR2006/004899
§ 371 (c)(1),
(2), (4) Date: Nov. 11, 2008

(87) PCT Pub. No.: WO2007/058515
PCT Pub. Date: May 24, 2007

(65) Prior Publication Data
US 2009/0067493 A1     Mar. 12, 2009

(30) Foreign Application Priority Data
Nov. 21, 2005 (KR) .................. 10-2005-0111239
Nov. 21, 2006 (KR) .................. 10-2006-0115194

(51) Int. Cl.
*H04N 7/12* (2006.01)

(52) U.S. Cl. .............. 375/240.03; 375/240; 375/240.01; 375/240.02; 375/240.04; 375/240.05; 375/240.06; 375/240.07; 375/240.22; 382/232; 382/251; 382/252; 382/253

(58) Field of Classification Search ..... 375/240–240.29; 382/232–308
See application file for complete search history.

(56) References Cited

U.S. PATENT DOCUMENTS
6,587,508 B1 *   7/2003   Hanamura et al. ....... 375/240.24
(Continued)

FOREIGN PATENT DOCUMENTS
WO     2004/025965     3/2004

OTHER PUBLICATIONS
SKKIM_Rate_Control_Algorithm_for_H.264_AVC_Video_Coding_Standard_Based_on_Rate-Quantization_Model by Kim et al; Publisher: IEEE; Year: 2004.*
(Continued)

*Primary Examiner* — Taghi Arani
*Assistant Examiner* — Madhuri Herzog
(74) *Attorney, Agent, or Firm* — Ladas & Parry LLP (57) ABSTRACT

Provided is a method and apparatus for controlling a bit-rates in which an amount of generated bits is adjusted according to the complexity of each frame, and a bit-rate within a frame can be further effectively adjusted by applying different quantization parameter (QP) values to respective macro blocks. In the apparatus for controlling a bit-rate, a motion compensated temporal filtering (MCTP) operation is performed for each group of pictures (GOP) in an input scalable layer, and thereafter bits are allocated to respective frames in consideration of frame type and frame complexity. Furthermore, a QP is adaptively determined in the unit of a macro block on the basis of the allocated bits.

20 Claims, 8 Drawing Sheets

U.S. PATENT DOCUMENTS

2004/0042548 A1* 3/2004 Yu et al. .................. 375/240.03
2006/0133497 A1 6/2006 Park et al.

OTHER PUBLICATIONS

Motion Compensated Temporal Filtering within the H.264/AVC Standard by Akyol et al; Publisher: IEEE: Year: 2004.*

Unconstrained motion compensated temporal filtering (UMCTF) for efficient and flexible interframe wavelet video coding by Turaga et al; Publisher: Elsevier B.V. Year: 2004.*

Jens-Rainer Ohm; "Three-Dimensional Subband Coding with Motion Compensation", IEEE Transactions on Image Processing, vol. 3, No. 5, Sep. 1994, pp. 559-571.

Seung-Jong Choi, et al; "Motion-Compensated 3-D Subband Coding of Video", IEEE Transactions on Image Processing, vol. 8, No. 2, Feb. 1999, pp. 155-167.

International Search Report mailed Feb. 22, 2007; PCT/KR2006/004899.

* cited by examiner

FIG. 1

| QP | 0 | 1 | 2 | 3 | 4 | 5 | 6 | 7 | 8 | 9 | 10 | ... |
|---|---|---|---|---|---|---|---|---|---|---|---|---|
| Qstep | 0.625 | 0.6875 | 0.8125 | 0.875 | 1 | 1.125 | 1.25 | 1.375 | 1.625 | 1.75 | 2 | ... |
| QP | ... | 18 | ... | 24 | ... | 30 | ... | 36 | ... | 42 | ... | 51 |
| Qstep | ... | 5 | ... | 10 | ... | 20 | ... | 40 | ... | 80 | ... | 224 |

|  | UNILATERAL PREDICTION (HAAR FILTER) | BILATERAL PREDICTION (5/3 FILTER) |
|---|---|---|
| H-FRAME | $\sqrt{1/2}$ | $\sqrt{23/32}$ |
| L-FRAME | $\sqrt{2/1}$ | $\sqrt{3/2}$ |

METHOD AND APPARATUS FOR CONTROLLING BITRATE OF SCALABLE VIDEO STREAM

TECHNICAL FIELD

Recently, the emergence of an Internet streaming video service and various portable mobile terminals has led to the development of a novel codec technique. In order to provide a service using a wired/wireless network such as an Internet streaming video service, there is a growing need for a video compression technique in consideration of a variable channel environment. Moreover, with the increase in the use of the various portable mobile terminals, a bit stream has become necessary in order to support multiple resolutions and multiple frame-rates.

To meet this requirement, a scalable video codec has been proposed which has various features in comparison with the conventional codec (MPEG-1, MPEG-2, or MP EG-4). The conventional codec enables a bit stream to be transmitted and decoded with a predetermined channel capacity. On the other hand, the scalable video codec can control a decoding process of the bit stream in an adaptive manner with respect to changes in channel capacity.

BACKGROUND ART

Scalable video coding (SVC) provides three scalability functions. First, a resolution scalability (or spatial scalability) function is provided to restore a part of received data to a video signal with a different resolution according to changes in channel capacity. Second, a frame scalability (or temporal scalability) function is provided to restore the received data to a video signal having various frame-rates. Last, a signal to noise ratio (SNR) scalability function is provided to reproduce a signal of a different video quality by decoding only part of the signal when information is partially received due to channel capacity constraints.

Various effective methods have been proposed in order to enhance capability of the SVC codec having the aforementioned features. Examples of the methods include a variable group of pictures (GOP) technique, an effective motion estimation technique, an optimized quantization technique, and so on. One of the most important techniques is a bit allocation technique that allocates bits for respective coding components.

This is because the bit allocation technique determines a video quality and has an effect on other modules of the codec (for example, motion estimation, quantization, etc). Therefore, the effective bit allocation technique for SVC has to be developed in order to improve capability of the SVC codec.

However, the method of controlling a bit-rate by using the conventional SVC codec has a problem in that an optimal video quality cannot be obtained at any bit-rate since not only initial quantization parameter (QP) values have to be properly known for all images but also the QP values are used in units of frames.

In addition, in the conventional technique, a high quality image can be obtained only when the suitable initial QP values are known for all sequences. However, if the initial QP values of an image are unknown, various problems occur. For example, when an image having a lot of motion is coded by using a large QP value, a low quality image may be produced. Furthermore, when an image having less motion is coded by using a small QP value, a large amount of bits are generated.

DETAILED DESCRIPTION OF THE INVENTION

Technical Problem

The present invention provides a technique in which an amount of generated bits is adjusted according to the complexity of each frame, and a bit-rate within a frame can be further effectively adjusted by applying different QP values to respective macro blocks.

Technical Solution

According to an aspect of the present invention, there is provided an apparatus for controlling a bit-rate comprising: an MCTF (motion compensated temporal filtering) unit in which each GOP (group of pictures) is subject to K MCTF operations with respect to temporal stages in an input scalable layer; a bit allocation unit which allocates bits to respective frames on the basis of the K temporal stages, frame types created for the respective K temporal stages, and frame complexities; and an adaptive quantization parameter (QP) adjusting unit which determines a QP in the unit of a macro block according to a difference between a bit amount, which is created when a macro block of each frame is actually coded, and a bit amount allocated to the macro block in each frame on the basis of a bit amount that is allocated to each frame and according to the number of bits per pixel within each frame.

In the aforementioned aspect of the present invention, each GOP and the bits allocated to the respective frames may be related by $R_G=(T/\text{frame-rate})*N$, where $R_G$ denotes a predetermined bit allocated to a GOP, T denotes a bit amount allocated to each frame, and N denotes a GOP size.

According to another aspect of the present invention, there is provided a scalable video encoder comprising: an MCTF unit in which each GOP is subject to K times of MCTF operations for temporal stages in an input scalable layer; and a bit allocation unit which allocates bits to respective frames on the basis of the temporal stages, frame types created for the respective temporal stages, and frame complexities.

In the aforementioned aspect of the present invention, the scalable video encoder may further comprise an adaptive QP adjusting unit which determines a QP in the unit of macro block according to a difference between a bit amount, which is created when a macro block of each frame is actually coded, and a bit amount allocated to the macro block in each frame on the basis of a bit amount that is allocated to each frame and according to the number of bits per pixel within each frame.

According to another aspect of the present invention, there is provided a method of controlling a bit-rate comprising: (a) performing K times of MCTF operations for each GOP with respect to temporal stages in an input scalable layer; (b) allocating bits to respective frames on the basis of the temporal stages, frame types created for the respective temporal stages, and frame complexities; and (c) determining a QP in the unit of macro block according to a difference between a bit amount, which is created when a macro block of each frame is actually coded, and a bit allocated to the macro block in each frame on the basis of a bit amount that is allocated to each frame and according to the number of bits per pixel within each frame.

According to another aspect of the present invention, there is provided a scalable video encoding method comprising: (a) performing K times of MCTF operations for each GOP with respect to temporal stages in an input scalable layer; and (b) allocating bits to respective frames on the basis of the temporal stages, frame types created for the respective temporal stages, and frame complexities.

Advantageous Effects

Figure 7A:
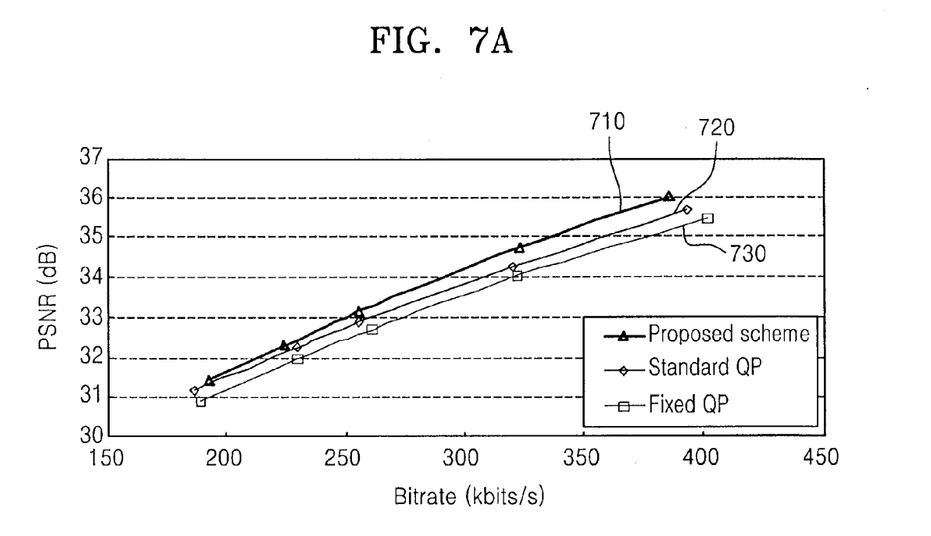
FIG. 7A is a graph illustrating an improved effect of a rate-distortion (RD) curve of an embodiment of the present invention at (football, layer0)
Figure 7B:
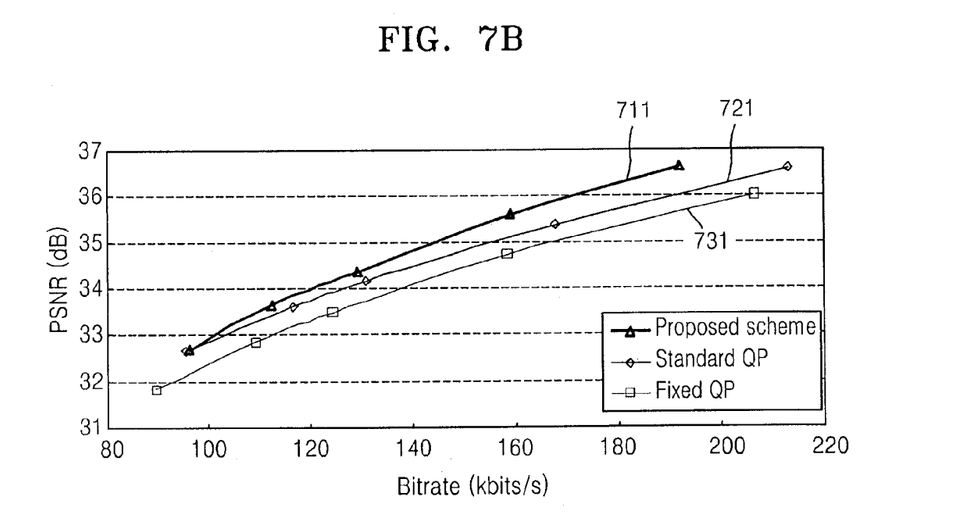
FIG. 7B is a graph illustrating an improved effect of an RD curve of an embodiment of the present invention at (crew, layer0)
Figure 8A:
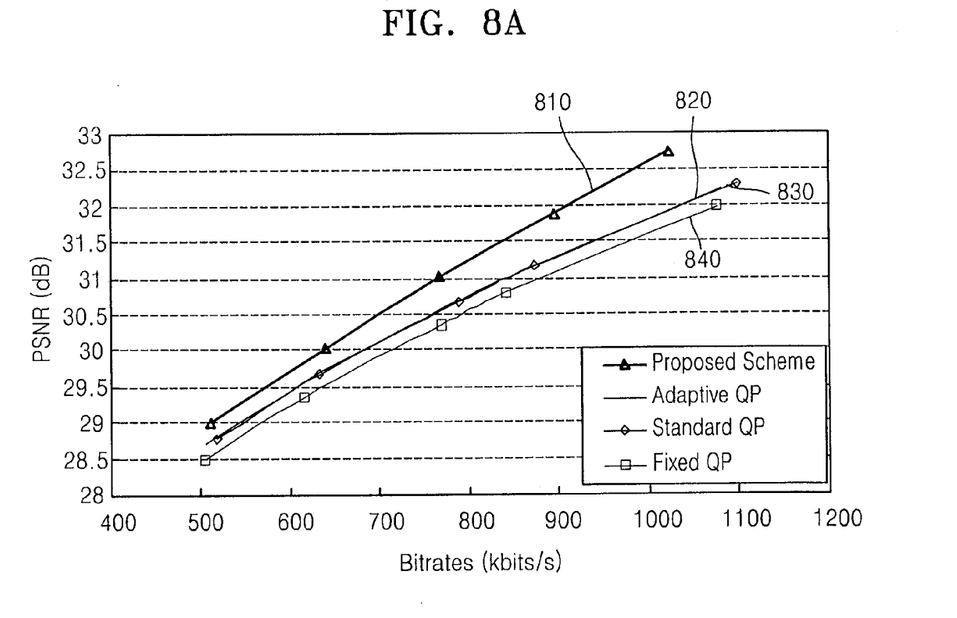
FIG. 8A is a graph illustrating an improved effect of an RD curve of an embodiment of the present invention at (football, layer0+layer1)
Figure 8B:
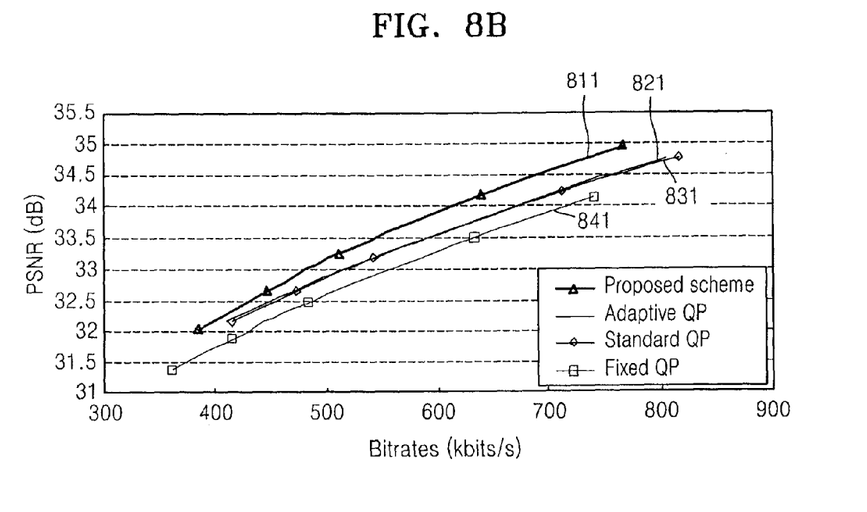
FIG. 8B is a graph illustrating an improved effect of an RD curve of an embodiment of the present invention at (crew, layer0+layer1)
Figure 9:
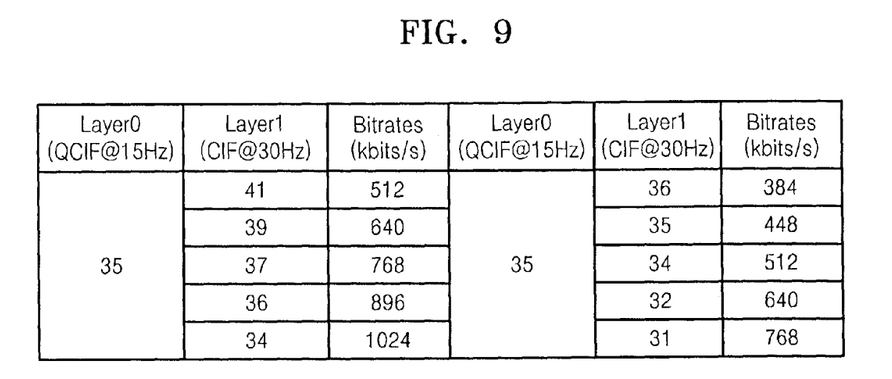
FIG. 9 is a table illustrating QP values of layers with respect to the image of a football and the image of a crew.

In FIGS. 7 to 9, an 'adaptive quantization parameter (QP)' is a value obtained by calculating a scaling factor and then applying different QPs to respective frames. A 'standard QP' is a value obtained by fixing a ratio of connected pixels to a fixed value in the process of calculating the scaling factor and then applying the fixed value to a QP.

FIG. 7A is a graph illustrating an improved effect of a rate-distortion (RD) curve of the present invention at (football, layer0), where R denotes a bit-rate and D denotes distortion". (football, layer0) FIG. 7B is a graph illustrating an improved effect of an RD curve of the present invention at (crew, layer0).

Football and crew are test images. The Layer 0 has a resolution and frame-rate of Quarter Common Intermediate Format (QCIF)@15 Hz. The Layer 1 has a resolution and frame-rate of Common Intermediate Format (CIF)@30 Hz. In experimentation, target bit-rates of an image of football are set to 192, 224, 256, 320, and 384 kbit/sec. Initial QPs for adjusting bit-rates of respective comparison modes are set to 31, 30, 29, 27, and 25.

Target bit-rates of an image of crew are set to 96, 112, 128, 160, and 192 kbit/sec. The initial QPs for adjusting bit-rates of respective comparison modes are set to 34, 32, 31, 29, and 27.

RD curves obtained by applying different parameters to respective frames according to a proposed scheme of an embodiment of the present invention are indicated by 710 and 711. RD curves obtained by fixing a ratio of connected pixels to a fixed value in the process of calculating the scaling factor and then applying the fixed value to a QP are indicated by 720 and 721. In this case, the ratios of connected pixels are fixed to the following values.

Rate L0=0.2
Rate L1=0.2
Rate Bi=0.6

When in a fixed QP mode, RD curves are indicated by 730 and 731. In the experimentation of FIG. 7, the same QP is used for all frames. In this case, the QP is equal to an initial QP. Modes described by 710 and 720 are determined in an encoder configuration file of JSVM2.0.

Scalable video coding (SVC) supports a spatial scalability. Since a spatial base layer is compatible with H.264/AVC, temporal scalability is achieved by using a hierarchical B picture method instead of performing a motion compensated temporal filtering (MCTF) method used in SVC. Therefore, unlike the MCTF method, the concept of connected pixels has no meaning because an update process is not required. Accordingly, the ratio of the connected pixels which determines a QP in the spatial base layer is a fixed ratio as indicated by 720.

Furthermore, in a prediction/update process of MCTF, a second prediction mode allows a spatial enhancement layer to have a second normalization variable. On the other hand, the spatial base layer using the hierarchical B picture is not subject to the update process and thus has the following new normalization variable for a base layer.

Factor_53_HP_BL=1.0
Factor_22_HP_BL=1.0

FIG. 8A is a graph illustrating an improved effect of an RD curve of an embodiment of the present invention at (football, layer0+layer1). FIG. 8B is a graph illustrating an improved effect of an RD curve of an embodiment of the present invention at (crew, layer0+layer1).

FIGS. 8A and B show results of experimentation for images of football and crew using two spatial layers, that is, the layer 0 and the layer 1. Since the hierarchical B picture is used in the layer 0, the adaptive QP, in which different QPs are applied to frames, cannot be used. Thus, in the case of an adaptive QP indicated by 820 in FIGS. 8A and B, the standard QP is used in the layer 0.

In order to perform an experimentation on the two spatial layers, a QP of the layer 0 that is the spatial base layer is fixed and then a QP of the layer 1 is modified in order to obtain a bit-rate generated at the moment as well as a peak signal-to-noise ratio (PSNR).

FIG. 9 is a table illustrating QP values of layers with respect to the images of foot ball and crew. Target bit-rates of the images of football and crew and QP values of the layer 0 and layer 1 depending on the target bit-rates are illustrated in the table.

As can be determined from the result of experimentation of FIGS. 7 to 9, in the method of controlling a bit-rate of an embodiment of the present invention, an image quality and a bit-rate are determined depending on an initial QP value. Furthermore, unlike the conventional method in which suitable QP values have to be known for given images, dependency on the initial QP value can be reduced, and the QP value can be adjusted according to frame complexity. Therefore, there is an advantage in that a better quality image can be obtained at the same bit-rate.

In addition, while the same QP is used in one frame in the conventional method of controlling a bit-rate, QP values are used differently for respective macro blocks. Thus, effective bit allocation can be achieved for given image information.

DESCRIPTION OF THE DRAWINGS

The above and other features and advantages of the present invention will become more apparent by describing in detail exemplary embodiments thereof with reference to the attached drawings in which.

BEST MODE

Hereinafter, exemplary embodiments of the present invention will be described with reference to the accompanying drawings. Like reference numerals in the drawings denote like elements. Redundant descriptions will be omitted for brevity.

1. To Control Bit-rate of Scalable Video Coding (SVC)

A current process of adjusting a bit-rate of SVC (JSVM2.0) includes an initial quantization parameter (QP) setting process and a re-adjusting process in which the QP is re-adjusted by using a scaling factor. The initial QP may be an arbitrary value. When the QP increases by a factor of 6, a quantization step size is doubled. Thus, a generated bit-rate decreases as the QP increases. Meanwhile, the scaling factor is determined in consideration of a feature of motion compensated temporal filtering (MCTF). The more the MCTF repeats temporal decomposition, the larger the value of the scaling factor is. The QP decreases as the value increases.

When two components having the aforementioned feature are combined, the QP is re-adjusted. The re-adjusted QP determines a generated bit-rate and an image quality. In the following first clause, the definition of QP and a method of determining QP will be described. Thereafter, in the second clause, a process of determining a scaling factor will be described.

(1) Definition and Determination of Quantization Parameter (QP)

JSVM2.0 is modeled based on H.264/Advanced Video Coding (AVC) for compatibility. Thus, its quantization method is the same as H.264/AVC. A basic quantization arithmetic method will now be described.

$$Z = \left( \frac{|\omega| + f \cdot \Delta}{\Delta} \right) \qquad \text{[Formula 1]}$$

In Formula 1, Z denotes a sample value obtained after quantization. ω denotes a sample value obtained as a result of transformation. $f|$ denotes an offset. Δ denotes a quantization step size (Qstep) which determines a degree of quantization. The quantization step size has a total of 52 cases.

Figure 1:
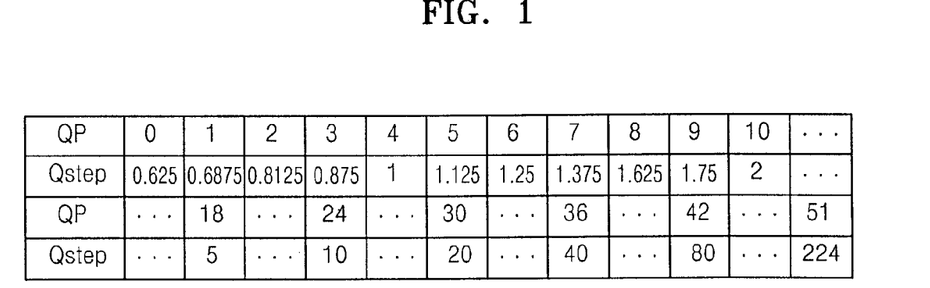
FIG. 1 shows a relationship between a quantization step size and a quantization parameter (QP)

QP denotes an index for representing this quantization step size. FIG. 1 shows a relationship between a quantization step size and a QP. Similar to H.264/AVC, the relationship between the quantization step size and the QP illustrated in FIG. 1 is used in the quantization process of SVC. Since the generated bit-rate and the image quality are determined by using the QP, it is important to determine a suitable QP by using a feature of an image.

In the SVC, the QP is determined according to Formula 2. In Formula 2, iQP denotes an arbitrary initial QP value. dScalingFactor denotes a scaling factor that is determined in consideration of a feature of MCTF in the SVC. A method of determining dScalingFactor will be described below in greater detail in (2) Process of Determining Scaling Factor.

$$dQP = iQP - (6 \times \log_2(d\text{ScalingFactor})) \qquad \text{[Formula 2]}$$

$$QP = \max(0, \min(51, \lfloor dQP + 0.5 \rfloor)) \qquad \text{[Formula 3]}$$

In Formula 2, dQP is determined by the initial QP (iQP) and the scaling factor (dScalingFactor). The dQP is adjusted to be an integer value between 0 and 51 which is a suitable range for representing the QP according to Formula 3.

(2) Process of Determining Scaling Factor

Figure 2:
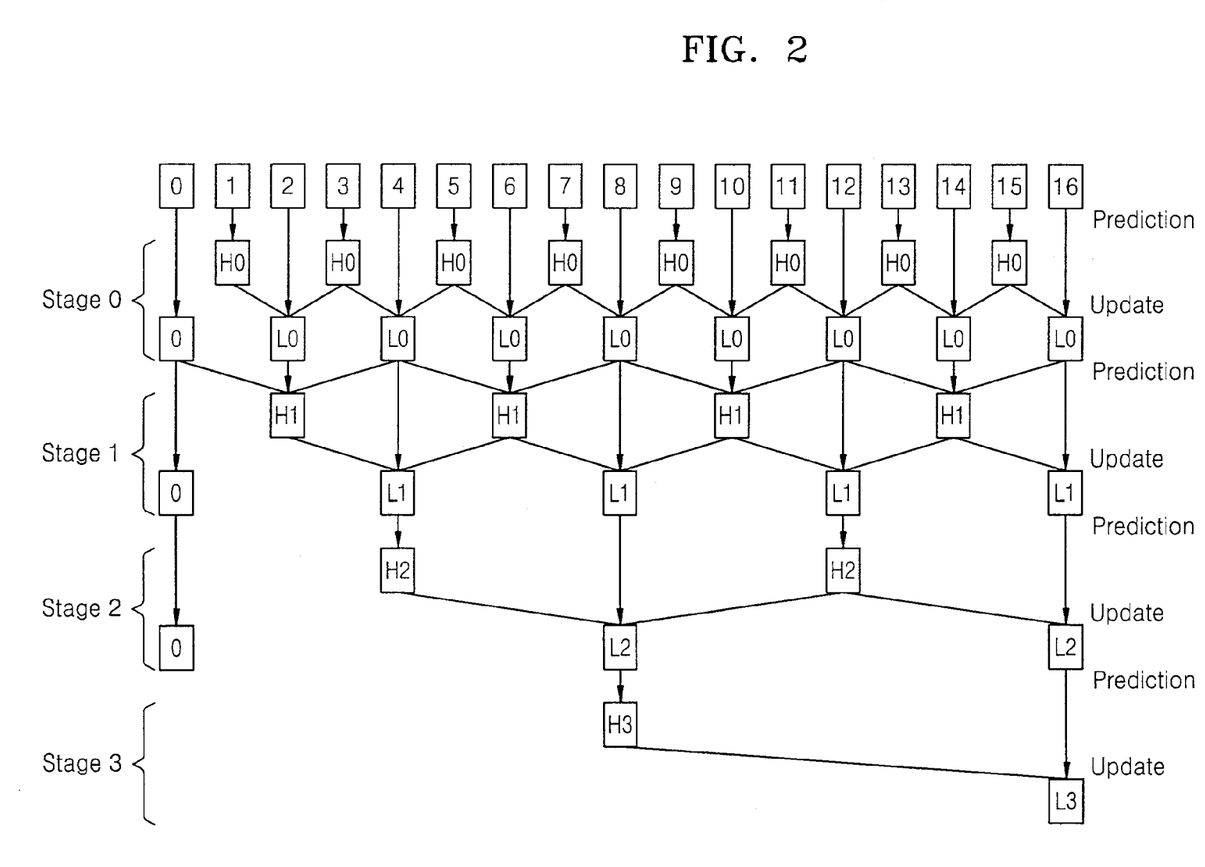
FIG. 2 shows a process of decomposing motion compensated temporal filtering (MCTF) for a group of pictures (GOP)

In Formula 2, the scaling factor, that is, the value of dScalingFactor, is determined in consideration of a feature of MCTF that supports a frame-rate scalability (or temporal scalability) of SVC. FIG. 2 shows a process of decomposing MCTF for a group of pictures (GOP). As shown in FIG. 2, the process of decomposing MCTG is performed in a unit of GOP. A high-pass (H) frame and a low-pass (L) frame are created in the prediction process and in the update process.

The H-frame is obtained by a signal difference between a target frame and a prediction frame. The L-frame is a signal that is reconstructed by removing a high frequency component of an original signal in order to create the H-frame of a next decomposition stage.

Stages illustrated in FIG. 2 are decomposition stages of MCTF. As the level of a stage increases, that is, as the number of times decomposition of MCTF is performed increases, the number of frames within one stage is reduced by half of that of a previously performed decomposition process. Such a decomposition process is repeated until only one H-frame and one-L frame are left in the stage.

Figure 3:
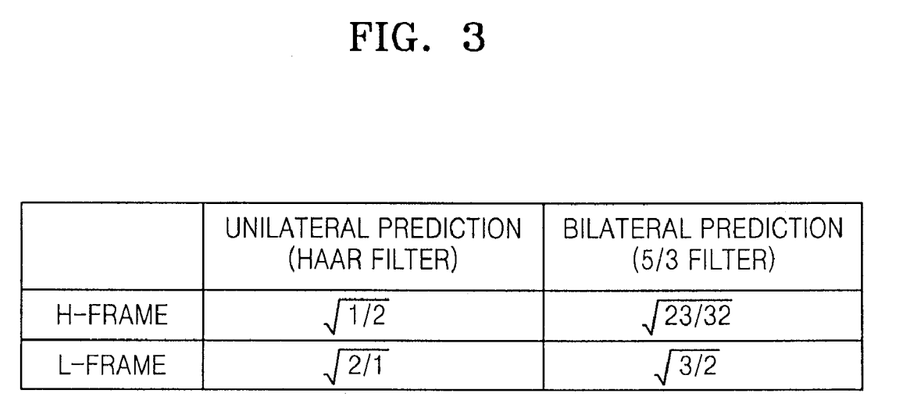
FIG. 3 shows a relationship between a prediction method and a normalization variable based on a frame type.

In the prediction and update processes, the H-frame and the L-frame are created by using a unilateral prediction method and a bilateral prediction method. According to the prediction methods and a frame type, normalization variables differ as shown in FIG. 3. FIG. 3 shows a relationship between a prediction method and a normalization variable based on frame type. The normalization variable is used to determine a scaling factor.

Furthermore, a ratio of connected pixels in one frame also determines the scaling factor. Due to a mismatch between the prediction process and the update process, connected pixels and unconnected pixels are created within a frame. The connected pixels indicate the extent of validity of each block. Thus, according to a decomposition stage of MCTF, the validity of a reference frame is represented by the ratio of connected pixels. The ratio of connected pixels are expressed by Formulas 4 to 6 according to respective prediction types in one frame.

$$\text{Rate}_{L0} = N_{L0}/N_{Total} \qquad \text{[Formula 4]}$$

$$\text{Rate}_{L1} = N_{L1}/N_{Total} \qquad \text{[Formula 5]}$$

$$\text{Rate}_{Bi} = N_{Bi}/N_{Total} \qquad \text{[Formula 6]}$$

In Formulas 4 to 6, $N_{Total}$ denotes the total number of pixels in one frame. $N_{L0}$, $N_{L1}$, $N_{Bi}$ respectively denote the total number of pixels forwardly predicted, the total number of pixels backwardly predicted, and the total number of pixels bilaterally predicted.

Figure 4:
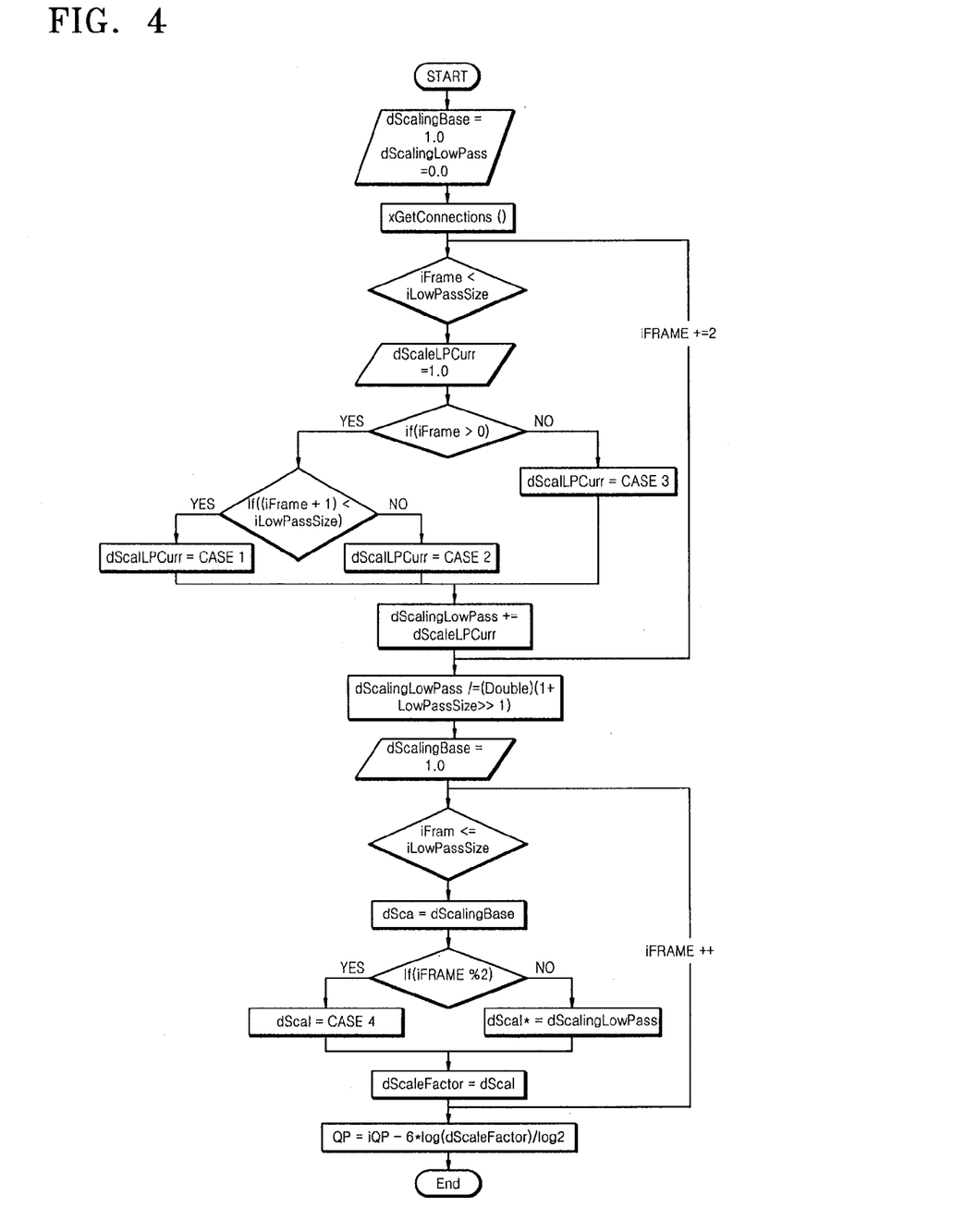
FIG. 4 is a flowchart of a process of calculating a scaling factor.

FIG. 4 is a flowchart of a process of calculating a scaling factor. In this process, the ratio of connected pixels and the normalization variable determined by using Formulas 4 to 6 are used. Each variable of FIG. 4 is shown in the same format as variables used in JSVM2.0 software. In FIG. 4, xGetConnections( ) is a function for calculating a connection ratio.

In FIG. 2 if a frame number is neither 0 nor 16, a scaling factor of an L-frame is calculated according to CASE 1. If it is 16, CASE 2 is used. If it is 0, CASE 3 is used. Each CASE 1, 2, and 3 are respectively expressed by Formulas 7 to 9.

$$(RateBi[(Frame-1)|RateBi[iFrame|1])\times(Factor\_53\_LP-1)/2$$

$$|(RateL1[iFrame-1]|RateL0[iFrame|1])\times(Factor\_22\_LP-1)/2|1 \quad [\text{Formula 7}]$$

$$RateBi[iFrame-1]/2\times(Factor\_53\_LP-1)$$

$$+RateL1[iFrame-1]\times(Factor\_22\_LP-1)+1 \quad [\text{Formula 8}]$$

$$RateBi[iFrame+1]/2\times(Factor\_53\_LP-1)$$

$$+RateL0[iFrame+1]\times(Factor\_22\_LP-1)+1 \quad [\text{Formula 9}]$$

In FIG. 3, the normalization variable may be redefined as follows. An H-frame unilaterally predicted is presented by Factor_22_HP. An L-frame unilaterally predicted is presented by Factor_22_LP. In addition, an H-frame bilaterally predicted is presented by Factor_53_HP. An L-frame bilaterally predicted is presented by Factor_53_LP.

Formulas 7 to 9 are used in the method of calculating a scaling factor by using the ratio of connected pixels of respective frames and the normalization variable. The scaling factor of the L-frame determined by using Formulas 7 to 9 becomes an initial value for determining a scaling factor of the H-frame in a corresponding stage by taking an average value in each stage. The scaling factor of the H-frame is finally determined by using Formula 10.

<Case 4>

$$RateBi[iFrame]\times(Factor\ 53\ HP-1)$$

$$+(RateL0[iFrame]+Rate\ L1[iFrame])\times(Factor\_22\_HP\ 1)+1 \quad [\text{Formula 10}]$$

Accordingly, a large scaling factor can be obtained when in a higher stage, that is, when an MCTF decomposition process is repeated. In addition, with respect to a frame type, a scaling factor of an L-frame has a value larger than a scaling factor of an H-frame. Since a small QP is determined by using Formula 2 when the scaling factor is great, more bits are assigned to an H-frame having a great scaling factor. This coincides with a feature in that a QP has to be determined inversely proportional to a frame energy.

In the aforementioned technical aspect, the frame energy is determined by using a scaling factor determined by the ratio of connected pixels and the normalization variable. This is because, in this method, the ratio of connected pixels is a value for indicating the validity of a reference frame in the prediction process and does not include information on a current frame.

Thus, the present invention proposes a method of allocating a target bit for each frame in consideration of frame complexity. In the present invention, a QP is determined to be inversely proportional to the frame energy.

If the frame energy is represented as an average value of a square of a pixel value, when this value is large in a frame, the frame is regarded as having high energy. Thus, the image quality is maintained when a large number of bits are allocated in a coding process using a small QP. On the contrary, a frame with a small square average value has low energy. Thus, a specific image quality can be maintained with a small number of bits in the coding process using a great QP.

Figure 5A:
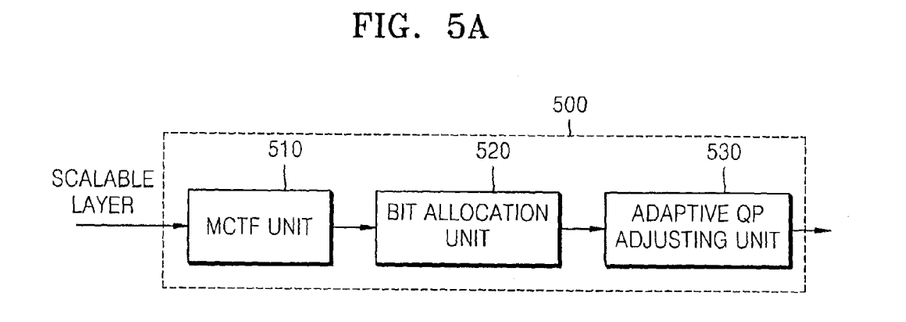
FIG. 5A shows an internal structure of an apparatus for controlling a bit-rate according to an embodiment of the present invention.

FIG. 5A shows an internal structure of an apparatus for controlling a bit-rate according to an embodiment of the present invention. The apparatus enables effective coding by allocating different QP values according to the frame complexity. In addition, QPs are properly allocated for respective macro blocks in consideration of features of the macro blocks.

An apparatus 500 for controlling a bit-rate includes an MCTF unit 510, a bit allocation unit 520, and an adaptive QP adjusting unit 530. The MCTF unit 510 performs a filtering process for an input scalable layer by using an MCTF method. Then, on the basis of the result of filtering, the bit allocation unit 520 allocates bits to respective frames in consideration of the frame complexity. Then, the adaptive QP adjusting unit 530 allocates suitable QPs to macro blocks in consideration of features of the macro blocks. Each element of the apparatus (500) will now be described in detail.

For each temporal stage, the MCTF unit 510 performs an MCTF operation K times with respect to each GOP in the input scalable layer.

Among a plurality of techniques used in wavelet based SVC, the MCTF is a core technique of SVC that can remove time-duplication and is flexible in terms of time. In the MCTF, coding is performed in the unit of GOP. A pair comprising a current frame and reference frame are temporally filtered in the direction of motion.

The MTCF process is performed for each spatial layer. As a result, one L-frame and (N−1) H-frames are created in each GOP. In this case, N denotes a GOP size, where $N=2^K$.

That is, when the SVC performs the MCTF operation in the unit of GOP prior to coding, a frame type in one GOP and an MCTF decomposition stage can be determined prior to coding. In addition, by using these features, in an embodiment of the present invention, bit allocation for each frame is performed in a unit of a GOP prior to coding. Different bits are allocated according to the frame type and the temporal stage.

Figure 5B:
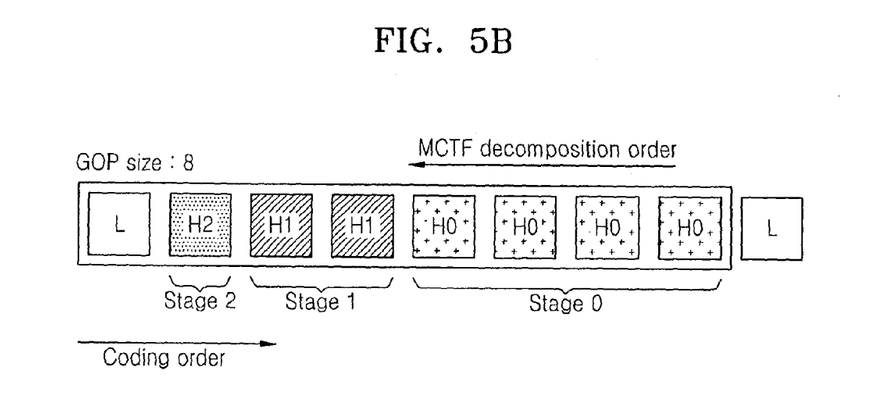
FIG. 5B shows a frame created in an MCTF decomposition process.

FIG. 5B shows a frame created in an MCTF decomposition process.

For each temporal stage, the MCTF operation is performed K times, where $N=2^K$ when the GOP size is N. The number of frames for each temporal stage is reduced by half when the MCTF operation is performed.

H-frames are indicated by H0, H1, and H2 for the respective temporal stages. The higher the MCTF decomposition order is, the farther the location of an image which is used for motion prediction of the prediction process. Thus, it is highly likely that correlation with a currently predicted image decreases.

That is, when a frame belongs to a high decomposition temporal stage, its motion is predicted in a frame that is far from the current frame. Thus, a large residual signal exists. In addition, the importance of this frame is high since it is referenced by a frame in a low decomposition temporal stage during the decoding process. In FIG. 5B, the H-frame includes many differential residual signals in the order of H2>H1>H0.

By performing K operations, the bit allocation unit 520 allocates bits to the respective frames on the basis of the temporal stages, frame types created for the respective temporal stages, and frame complexities. The frame complexity may be calculated from the square root of the sum of the square of each pixel values in a frame. The frame complexity is expressed by Formula 11.

$$X_i = \sqrt{\Sigma(P_i)^2} \quad [\text{Formula 11}]$$

In Formula 11, $X_i$ denotes the frame complexity of an i-th frame. $P_i$ denotes a pixel value in the i-th frame. According to Formula 11, frame energy can be calculated by using pixel values in the H-frame and the L-frame created after the MCTF decomposition process. The frame complexities of the respective frames illustrated in FIG. 5B are indicated by $X_L$, $X_{HS2}$, $X_{HS1}$, and $X_{HS0}$, where $X_L > X_{HS2} > X_{HS1} > X_{HS0}$.

Formulas 12 to 14 are used in the method of allocating bits to the respective frames in consideration of the fame complexities according to a frame type and each decomposition temporal stage.

A bit $T_L$ that is to be allocated to the L-frame (see FIG. 5B) is calculated by using Formula 12.

$$T_l = \left( \frac{R_G}{N_i - N_{HS2}\frac{Avg(X_{HS2})}{Avg(X_i)} + N_{HS1}\frac{Avg(X_{HS1})}{Avg(X_L)} + N_{HS0}\frac{Avg(X_{HS0})}{Avg(X_L)}} \right) \times \frac{X_L}{Avg(X_i)} \quad \text{[Formula 12]}$$

In Formula 12, L, HS2, HS1, and HS0 respectively denote an L-frame, an H-frame in stage 2, an H-frame in stage 1, and an H-frame in stage 0. $N_i$ (where, i=L, HS2, HS1, or HS0) denotes the numbers of types of frames existing in the GOP. $X_i$ denotes the complexity of each frame. $Avg(X_i)$ denotes an average value of the complexity of each frame with respect to each temporal stage.

$R_G$ denotes a target bit amount allocated in one GOP. The relationship between $R_G$ and a target bit T allocated to a frame is given by Formula 13.

$$R_G = (T/\text{frame-rate})*N \quad \text{[Formula 13]}$$

Similar to the concept of obtaining a bit amount $T_L$ to be allocated to the L-frame in Formula 12, a bit amount to be allocated to the H-frame in stage 2 of FIG. 5 is expressed by Formula 14.

$$T_{HS2} = \left( \frac{R'_0}{N_{HS2} - N_{HS}\frac{Avg(X_{HS1})}{Avg(X_{HS2})} + N_{HS0}\frac{Avg(X_{HS0})}{Avg(X_{HS2})}} \right) \times \frac{X_{HS2}}{Avg(X_{HS2})} \quad \text{[Formula 14]}$$

In Formula 14, $R_G'$ denotes a bit amount obtained by excluding a bit amount created in the process of decoding a previous frame, that is, the L-frame, from the bit amount allocated to the GOP.

Formulas 15 and 16 are respectively used to calculate bit amounts to be allocated to frames in stages 1 and 0 of FIG. 5B.

$$T_{HS} - \left( \frac{R'_G}{N_{HS1} + N_{HS0}\frac{Avg(X_{HS0})}{Avg(X_{HS1})}} \right) \times \frac{X_{HS1}}{Avg(X_{HS})} \quad \text{[Formula 15]}$$

$$T_{HS1} - \left( \frac{R'_G}{N_{HS0}} \right) \times \frac{X_{HS0}}{Avg(X_{HS0})} \quad \text{[Formula 16]}$$

By using Formulas 12 and 14 to 16, by performing K operations, the MCTF unit 510 allocates bits to the respective frames on the basis of temporal stages, frame types created for each of the temporal stages, and frame complexities. In addition, bit allocation is differently performed even in the same stage in consideration of the frame complexities.

The bit amounts allocated to the respective frames by using Formulas 12 and 14 to 16 constraint a minimum value and a maximum value of a bit amount properly allocated to a frame that comes in a next order in the coding process performed in the unit of GOP. For example, this may be expressed by Formula 17.

$$\frac{TargetBit}{FrameRate} \times \frac{1}{2} \leq T_L, T_{HS2}, T_{HS1}, T_{HS0} \leq \frac{TargetBit}{FrameRate} \times 2 \quad \text{[Formula 17]}$$

The adaptive QP adjusting unit 530 determines a QP in the unit of a macro block according to a difference between a bit amount, which is created when a macro block of each frame is actually coded, and a bit amount allocated to the macro block in each frame on the basis of a bit that is allocated to each frame by the bit allocation unit 520 and according to the number of bits per pixel within each frame.

In an embodiment of the present invention, the adaptive QP adjusting unit 530 determines a reference value of a QP to be used in each macro block according to the extent of fullness of a virtual buffer by using a method of controlling a bit-rate of MPEG-2 TM.

In this case, the reference value is used to determine the QP of a macro block to be currently coded. The QP to be used in the current macro block is adjusted by using a difference between a bit amount allocated to each frame and a bit amount created by actual coding which is obtained by using Formulas 12 and 14 to 16.

Formulas 18 to 21 will be used to describe a process of determining a QP by the adaptive QP adjusting unit 530 according to an embodiment of the present invention.

$$D_j^i = D_0^2 + \left( B_{j-1}^i - \frac{T_i \times (j-1)}{MB\_total} \right) \quad \text{[Formula 18]}$$

In this case, $D_j^i$ denotes the fullness of a virtual buffer of a j-th macro block of an i-th frame. $D_0^i$ denotes the fullness of an initial virtual buffer of the i-th frame. $B_{j-1}^i$ is the total bit amount generated until a (j−1)th macro block is coded in the i-th frame. $T_i$ denotes a bit amount allocated to the i-th frame by the bit allocation unit. j denotes the j-th macro block within the i-th frame. MB_total denotes the total number of macro blocks within the i-th frame.

The fullness of the initial virtual buffer $D_0^i$ of the i-th frame is calculated by using Formula 19.

$$D_0^i - (iQP - AvgQP^{i-1}) * \gamma/52 \quad \text{[Formula 19]}$$

iQP denotes an initial QP value. $AvgQP^{i-1}$ denotes an average QP of a previous frame that exists in each temporal stage through the K times of MCTF operations.

Formulas 18 and 19 may be used to calculate the fullness of the virtual buffer immediately before the current macro block is coded. By using the fullness of the virtual buffer, $QP_j$ that is a QP of the i-th macro block in the i-th frame is calculated by Formula 20. In Formula 20, the initial QP (iQP) is determined by using Formula 21.

$$QP_j \frac{D_j^* * 52}{\gamma} \quad \text{[Formula 20]}$$

Here, γ|=2*bit-rate/frame-rate if ((bpp<=0.2) iQP=38;

else if (bpp<=0.5) iQP=33;

else if (bpp<=0.8) iQP=28;

else iQp=23;    [Formula 21]

In Formula 21, bpp is bit-rate/(frame-rate*width*height), which is the number of bits per pixel in one frame (bits/pixel). As shown in Formula 21, iQP has a feature in that its value decreases with the increase in the bit-rate for each frame within a specific section.

The bit-rate control apparatus may be used in an encoder that encodes a scalable video stream.

Figure 6:
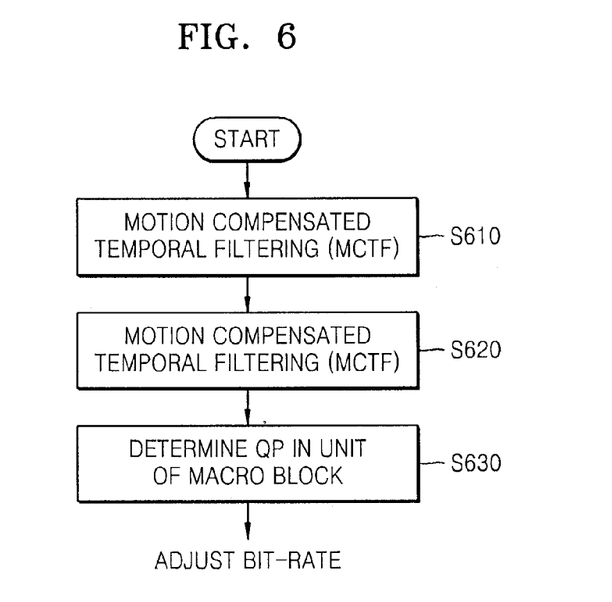
FIG. 6 is a flowchart illustrating a method of controlling a bit-rate according to an embodiment of the present invention.

FIG. 6 is a flowchart illustrating a method of controlling a bit-rate according to an embodiment of the present invention.

For each temporal stage, the MCTF operation is performed K times with respect to each GOP in the input scalable layer, thereby creating one L-frame and ($2^{K-1}$) H-frames (operation S610).

Thereafter, bits are allocated to the respective frames on the basis of the temporal stages, frame types created for each of the temporal stages, and frame complexities (S620).

A QP is determined in the unit of a macro block according to a difference between a bit amount, which is created when a macro block of each frame is actually coded, and a bit amount allocated to the macro block in each frame on the basis of a bit amount that is allocated to each frame in the above stages and according to the number of bits per pixel within each frame (operation S630).

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. An apparatus for controlling a bit-rate comprising:
a processor and a memory, the memory having stored thereon:
an MCTF (motion compensated temporal filtering) unit in which each unit of GOP (group of pictures) is subject to K MCTF operations with respect to temporal stages in an input scalable layer,
where K in an integer greater than 1;
a bit allocation unit which allocates bits to respective frames based on K temporal stages, frame types created for the respective K temporal stages, and frame complexities,
wherein, in the bit allocation unit, a bit amount allocated to each frame has limited minimum and maximum values based on an order of the respective frames in a coding process in an unit of the GOP, and
wherein a bit allocation of a previous frame having a limited minimum and maximum value determines a bit allocation of a next frame having a limited minimum and maximum value according to the order of the coding process in the unit of the GOP, and
wherein the frame complexities are configured based on a number of bits per pixel within each frame; and
an adaptive quantization parameter (QP) adjusting unit which determines a QP in a unit of a macro block according to a difference between a bit amount, which is created when a macro block of each frame is actually coded, and a bit amount allocated to the macro block in each frame based on a bit amount that is allocated to each frame and according to the number of bits per pixel within each frame, and
wherein the number of bits per pixel within each frame decreases each time the integer value of the K increases by a factor of 1.

2. The apparatus of claim 1, wherein each GOP and the bits allocated to the respective frames are related by $R_G=(T/\text{frame-rate})*N$, where $R_G$ denotes a predetermined bit amount allocated to a GOP, T denotes a bit amount allocated to each frame, and N denotes a GOP size.

3. The apparatus of claim 1,
wherein the adaptive QP adjusting unit calculates fullness of a virtual buffer by using $$D_j^i = D_0^2 + \left(B_{j-1}^i - \frac{T_i \times (j-1)}{\text{MB\_total}}\right),$$

where $D_j^i$ denotes the fullness of a virtual buffer of a j-th macro block of an i-th frame, $D_0^i$ denotes the fullness of an initial virtual buffer of the i-th frame, $B_{j-1}^i$ is a total bit amount generated until a (j−1)th macro block is coded in the i-th frame, $T_i$, denotes a bit amount allocated to the i-th frame by the bit allocation unit, j denotes a j-th macro block within the i-th frame, and MB_total denotes a total number of macro blocks within the i-th frame, and
wherein a $QP_j$, that is a QP of the j-th macro block within the i-th frame is expressed by $$QP_j = \frac{D_j^* * 52}{\gamma},$$

where y=2*bit-rate/frame-rate.

4. The apparatus of claim 3,
wherein the $D_0^i$ is calculated by using $D_0^i-(\text{iQP}-\text{AvgQP}^{i-1})*\gamma/52$, where iQP denotes an initial QP value, $\text{AvgQP}^{i-1}$ denotes an average QP of a previous frame that exists in each temporal stage, and
wherein iQP has a feature in that its value decreases with the increase in the number of bits for each frame within a specific section.

5. The apparatus of claim 1, wherein the minimum value is half a value obtained by dividing the bit amount allocated to the respective frames by a frame-rate, and the maximum value is twice a value obtained by dividing the bit amount allocated to the respective frames by the frame-rate.

6. The apparatus of claim 1, wherein the GOP has a size of $2^K$.

7. The apparatus of claim 1, wherein each frame complexity is a square root of a sum of a square of each pixel value within a frame.

8. A scalable video encoder comprising:
a processor and a memory, the memory having stored thereon:
an MCTF (motion compensated temporal filtering) unit in which each GOP (group of pictures) is subject to K MCTF operations for temporal stages in an input scalable layer;

where K in an integer greater than 1; and
a bit allocation unit which allocates bits to respective frames based on K temporal stages, frame types created for the respective K temporal stages, and frame complexities,
wherein, in the bit allocation unit, a bit amount allocated to each frame has limited minimum and maximum values based on an order of the respective frames in a coding process in an unit of the GOP, and
wherein a bit allocation of a previous frame having a limited minimum and maximum value determines a bit allocation of a next frame having a limited minimum and maximum value according to the order of the coding process in the unit of the GOP, and
wherein the frame complexities are configured based on a number of bits per pixel within each frame;
an adaptive quantization parameter (QP) adjusting unit which determines a QP in the bit allocation unit of a macro block according to a difference between a bit amount, which is created when a macro block of each frame is actually coded, and a bit amount allocated to the macro block in each frame on the basis of a bit amount that is allocated to each frame and according to the number of bits per pixel within each frame, and
wherein the number of bits per pixel within each frame decreases each time the integer value of the K increases by a factor of 1.

9. The scalable video encoder of claim 8, wherein the GOP has a size of $2^K$.

10. The scalable video encoder of claim 8, wherein each frame complexity is a square root of a sum of a square of each pixel value within a frame.

11. A method of controlling a bit-rate comprising:
(a) performing K MCTF (motion compensated temporal filtering) operations for each unit of GOP (group of pictures) with respect to temporal stages in an input scalable layer,
where K in an integer greater than 1;
(b) allocating bits to respective frames on the basis of the K temporal stages, frame types created for the respective K temporal stages, and frame complexities,
wherein, in the bit allocation unit, a bit amount allocated to each frame has limited minimum and maximum values based on an order of the respective frames in a coding process in an unit of the GOP, and
wherein a bit allocation of a previous frame having a limited minimum and maximum value determines a bit allocation of a next frame having a limited minimum and maximum value according to the order of the coding process in the unit of the GOP, and
wherein the frame complexities are configured based on a number of bits per pixel within each frame; and
(c) determining a quantization parameter (QP) in the a unit of a macro block according to a difference between a bit amount, which is created when a macro block of each frame is actually coded, and a bit amount allocated to the macro block in each frame on the basis of a bit amount that is allocated to each frame and according to the number of bits per pixel within each frame, and
wherein the number of bits per pixel within each frame decreases each time the integer value of the K increases by a factor of 1.

12. The method of claim 11, wherein each GOP and the bits allocated to the respective frames are related by $R_G=(T/\text{frame-rate})*N$, where $R_G$ denotes a predetermined bit amount allocated to a GOP, T denotes a bit amount allocated to each frame, and N denotes a GOP size.

13. The method of claim 11, wherein, in (c), the fullness of a virtual buffer is calculated by using
wherein the adaptive QP adjusting unit calculates fullness of a virtual buffer by using $$D_j^i = D_0^2 + \left(B_{j-1}^i - \frac{T_i \times (j-1)}{\text{MB\_total}}\right),$$

where $D_j^i$ denotes the fullness of a virtual buffer of a j-th macro block of an i-th frame, $D_0^i$ denotes the fullness of an initial virtual buffer of the i-th frame, $B_{j-1}^i$ is a total bit amount generated until a (j−1)th macro block is coded in the i-th frame, $T_i$, denotes a bit amount allocated to the i-th frame by the bit allocation unit, j denotes a j-th macro block within the i-th frame, and MB_total denotes a total number of macro blocks within the i-th frame, and
wherein a $QP_j$ that is a QP of the j-th macro block within the i-th frame is expressed by $$QP_j = \frac{D_j^* * 52}{\gamma},$$

where y=2*bit-rate/frame-rate.

14. The method of claim 13,
wherein the $D_0^i$ is calculated by using $D_0^i$−(iQP−AvgQP$^{i-1}$)*γ/52, where iQP denotes an initial QP value, AvgQPi−1 denotes an average QP of a previous frame that exists in each temporal stage, and
wherein iQP has a feature in that its value decreases with the increase in the number of bits for each frame within a specific section.

15. The method of claim 11, wherein the minimum value is half a value obtained by dividing the bit amount allocated to the respective frames by a frame-rate, and the maximum value is twice a value obtained by dividing the bit amount allocated to each of the frames by the frame-rate.

16. The method of claim 11, wherein the GOP has a size of $2^K$.

17. The method of claim 11, wherein each frame complexity is a square root of a sum of a square of each pixel value within a frame.

18. A scalable video encoding method comprising:
(a) performing K MCTF (motion compensated temporal filtering) operations for each GOP (group of pictures) with respect to temporal stages in an input scalable layer;
where K in an integer greater than 1; and
(b) allocating bits to respective frames on the basis of the temporal stages, frame types created for the respective temporal stages, and frame complexities
wherein a bit amount allocated to each respective frame has limited minimum and maximum values based on an order of the respective frames in a coding process in an unit of the GOP and
wherein a bit allocation of a previous frame having a limited minimum and maximum value determines a bit allocation of a next frame having a limited minimum and maximum value according to the order of the coding process in the unit of the GOP, and
wherein the frame complexities are configured based on a number of bits per pixel within each frame;
determining a quantization parameter (QP) in a unit of a macro block according to a difference between a bit amount, which is created when a macro block of each frame is actually coded, and a bit amount allocated to the macro block in each frame on the basis of a bit amount that is allocated to each frame and according to the number of bits per pixel within each frame, and wherein the number of bits per pixel within each frame decreases each time the integer value of the K increases by a factor of 1.

19. The scalable video encoding method of claim 18, wherein the GOP has a size of $2^K$.

20. The scalable video encoding method of claim 18, wherein each frame complexity is a square root of a sum of a square of each pixel values within a frame.

* * * * *